(12) United States Patent
Boccio

(10) Patent No.: US 6,368,691 B1
(45) Date of Patent: Apr. 9, 2002

(54) SUBSTRATES DISK FOR DIGITAL VIDEO

(75) Inventor: Louis J. Boccio, Miller Place, NY (US)

(73) Assignee: STEAG HamaTech AG (DE)

( * ) Notice: Subject to any disclaimer, the term of this patent is extended or adjusted under 35 U.S.C. 154(b) by 0 days.

(21) Appl. No.: 09/247,483

(22) Filed: Feb. 9, 1999

(Under 37 CFR 1.47)

(30) Foreign Application Priority Data

Feb. 9, 1998 (DE) .......................... 198 04 976

(51) Int. Cl.[7] .................................. B32B 3/10
(52) U.S. Cl. ................ 428/64.1; 428/64.2; 428/66.6; 369/280; 369/281; 369/282
(58) Field of Search .................. 428/64.2, 64.3, 428/64.4, 66.6, 64.1; 369/282, 280, 281, 290

(56) References Cited

U.S. PATENT DOCUMENTS 2,501,465 A * 3/1950 Caramanoff ................. 369/290
5,867,477 A * 2/1999 Naito et al. ................. 369/290

FOREIGN PATENT DOCUMENTS

EP 0305199 3/1989
JP 0813834 5/1996

* cited by examiner

Primary Examiner—Alexander S. Thomas
(74) Attorney, Agent, or Firm—R W Becker & Associates; R W Becker

(57) ABSTRACT

A substrate disk consists of a first and a second substrate connected to one another wherein the first and second substrates have center holes. The first substrate has at least one projection positioned at the circumference of the center hole and projecting from the face of the substrate. In a preferred embodiment an annular projection surrounding the center hole is provided.

10 Claims, 1 Drawing Sheet

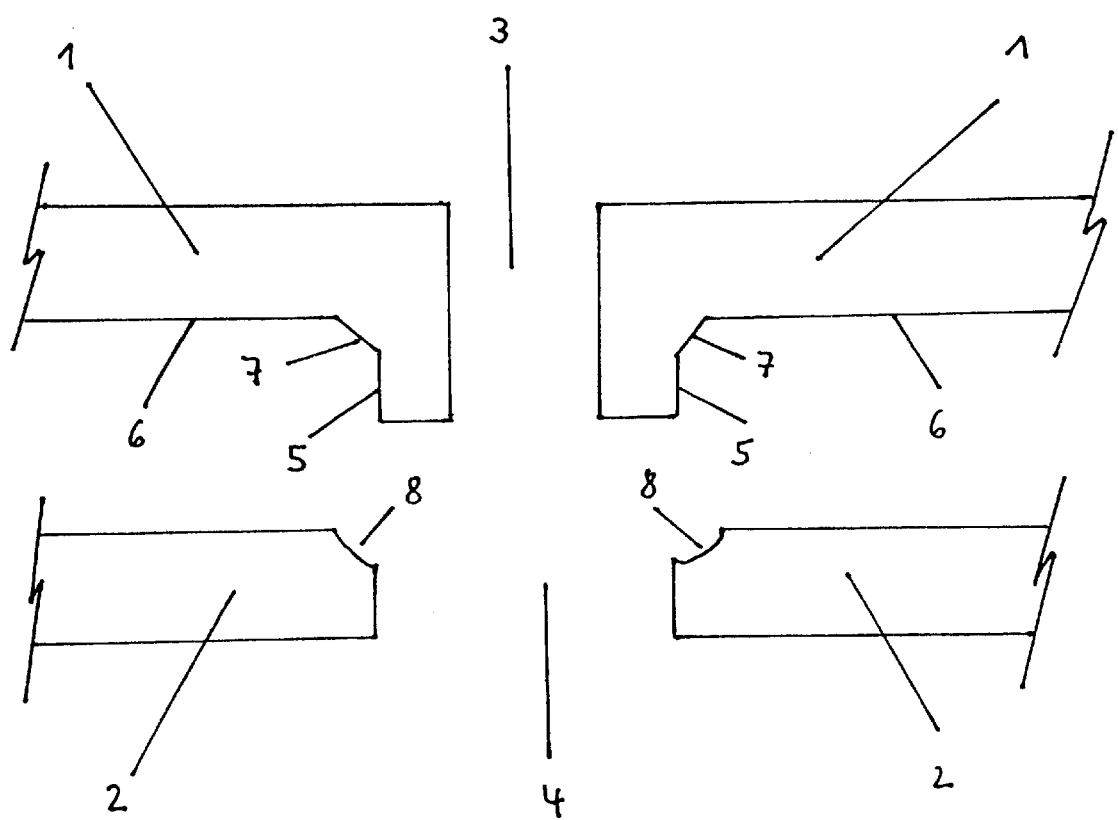

SUBSTRATES DISK FOR DIGITAL VIDEO

BACKGROUND OF THE INVENTION

The present invention relates to a substrate disk comprised of two substrates connected to one another and having a center hole.

Substrate disks of this kind are, for example, known as so-called digital versatile disks (DVD), e.g. video and other data disks, and are comprised of two substrates or partial substrates having digital information stored on a respective surface thereof and connected by gluing the faces to one another. For connecting the two substrates to form a substrate disk, for example, a digital video disk, very precisely operating devices are required because the substrates not only must be positioned precisely one above the other, but also the gluing process must be uniform over the entire substrate surfaces and without inclusion of air bubbles and producing adhesive layers of different thickness. This is necessary in order to provide high-quality fail-safe substrate disks. Furthermore, the conventional devices for gluing the two substrates are very complicated in their construction and require a large space. For the step of gluing, the two substrates must be aligned very precisely relative to one another which is very difficult to achieve. Furthermore, there is the risk that the two substrates forming the substrate disk can accidently separate from one another. For example, when removing a DVD from a DVD player that can accommodate multiple DVDs, it may occur that the DVD to be removed is canted so that the substrates will separate from one another. A further disadvantage of the gluing process is that the adhesive or glue lacquer can enter the center hole since one substrate is pressed onto the other after application of the adhesive in the inner area of the other substrate. This results in changes of the inner diameter of the center hole and diminishes the quality of the substrate disk.

It is therefore an object of the present invention to provide a substrate disk which can be produced with minimal reject rate and which has improved quality and service life.

SUMMARY OF THE INVENTION

This object is inventively solved in that one of the substrates forming the substrate disk is provided at the circumference of the center hole with at least one projection projecting from the substrate face. This has the advantage that upon connection, for example, by gluing, of the substrates a precise centering is possible without additional centering measures or devices. During the gluing step of the substrate disk, the adhesive is applied in the vicinity of the center hole onto one of the substrates. The other substrate is then placed thereon and pressed against the first substrate to a greater or lesser degree. In conventional substrate disks the adhesive can reach the center hole during this process so that the dimensional specifications of the disk can no longer be maintained and the quality specifications are no longer met. The projection at the circumference of the center hole of one of the substrates prevents the adhesive from flowing into the center hole. Furthermore, the substrate disk, because of the presence of the projection at the circumference of the center hole of one of the substrates, is protected to a greater extent with respect to accidental separation of the two substrates from one another when the substrates, for example, upon lifting from the receiving pin of the DVD player are canted.

In one advantageous embodiment of the invention the projection of the one substrate extends over the entire circumference of the center hole. This ensures that the adhesive or adhesive lacquer after pressing one substrates on to the other substrate, cannot penetrate at any location of the circumference of the center hole into the circumferential wall surface of the center hole. Furthermore, with the additional gluing of the circumferential wall surface of the center hole an especially stable connection of the two substrates is achieved.

In another advantageous embodiment of the present invention, the other substrate without projection is provided at the inner edge of the center hole with a recess which can be, for example, concave. This recess serves as a reservoir for the adhesive or the adhesive lacquer which will flow, upon pressing of the substrates onto one another, in the direction of the center hole of the substrate disk.

In yet another advantageous embodiment of the invention, the transition portion between the face of the substrate and the projection is slanted or rounded. This allows an easier flow of the plastic material during manufacture of the substrate by a molding process in comparison to a right angle embodiment of the transition portion so that the substrate homogenitity and thus the quality of the substrate disk are improved. Furthermore, such an embodiment reduces the risk of breakage of the projection and thus increases the stability of the substrate disk.

BRIEF DESCRIPTION OF THE DRAWINGS

The object and advantages of the present invention will appear more clearly from the following specification in conjunction with the accompanying drawing showing in only FIG. 1 two substrates with their respective center holes to be combined to a substrate disk by gluing, whereby the FIGURE shows only the center portion of the substrates.

DESCRIPTION OF PREFERRED EMBODIMENTS

The present invention will now be described in detail with the aid of a specific embodiment utilizing the only FIG. 1.

The upper substrate 1 has at the circumference of the center hole 3 an annular projection 5 which projects from the face 6 facing the other substrate 2 so that the projection faces the lower substrate 2. Instead of a single annular projection, a number of individual, equidistantly arranged projections 5 may be positioned about the circumference of the center hole 3. The inner diameter of the projection 5 defines the diameter of the center hole of the finished substrate disk. For DVDs the diameter is conventionally 15 mm. The transition portion 7 between the projection 5 and the face 6 of the substrate 1 is at a slant in the shown embodiment, but can also be rounded. This facilitates not only the manufacturing process when producing the substrate 1 by molding, but also increases the stability of the projection 5. The lower substrate 2 has no projection, and accordingly. The diameter of the center hole 4 is slightly greater than the outer diameter of the projection 5. Thus, the projection 5 of the upper substrate 1, when the substrates 1 and 2 are combined, is positioned in the center hole 4 of the lower substrate 2.

When producing the substrate disk by gluing of the two substrates 1, 2, the lower substrate 2 is provided in the vicinity of the center hole 4 with an adhesive in a circular pattern. Subsequently, the upper substrate 1 is placed and pressed onto the lower substrate 2 before the two substrates 1, 2 resting on one another are rotated so that the adhesive is distributed uniformly to the outer edge of the substrates 1, 2 by centrifugal forces and a uniform layer of adhesive of uniform thickness is formed. Methods and devices for gluing substrates to produce substrate disks are, for example, known from German Patent Application DE 197 18 471 A1.

During application of the upper substrate 1 onto the lower substrate 2 and/or the application of a certain pressure before the rotation process, the adhesive is forced in the direction toward the center hole 4 and reaches the area of the center hole 4 so that in conventional substrate disks contamination of this area will occur and no defined center hole diameter is ensured. The projection 5 prevents the adhesive from reaching the circumferential wall surface of the center hole because the projection 5 does not allow flow of the adhesive into this area. In order to ensure and also in order to be able to have great tolerances with regard to the amount of adhesive to be applied, the lower substrate 2 at the edge of the center hole 4 facing the upper substrate 1 is provided with a recess or a cutout 8 which in the shown embodiment is embodied as a concave groove. This recess 8 serves as a receiving space for excess adhesive so that contamination of the center hole of the substrate disk is reliably prevented when the amount of excess adhesive is great.

The projection 5 according to the shown embodiment projects preferably to such an extent from the face 6 of the substrate 1 that in the connected state of the two substrates 1, 2 the circumferential wall surface of the center hole 4 of the lower substrate 2 is completely covered. In this manner, in comparison to conventional substrate disks, a defined inner wall of the center hole (3) of the finished disk with smooth surfaces free of adhesive is produced. This is very advantageous when using these disks, for example, in respective disk players with respect to their manipulation. The projection 5 also protects the connecting area between the two substrates, and the risk of separation of the two substrates forming the disk during use, especially when removing the disk from the pin of the disk player, is minimal.

The invention has been disclosed by describing a preferred embodiment. However, to a person skilled in the art other embodiments and developments of the invention and the disclosed embodiment will be obvious without leaving the gist of the invention. For example, it is possible to use the substrate 1 with projection 5 as the lower substrate during the manufacturing process and to place onto it subsequently the substrate 2 without projection as the upper substrate. In this case a secure alignment of the two substrates relative to one another is still reliably provided by the projection 5 without the need for further alignment means.

The specification incorporates by reference the disclosure of German priority document 198 04 976.5 of Feb. 9, 1998.

The present invention is, of course, in no way restricted to the specific disclosure of the specification and drawings, but also encompasses any modifications within the scope of the appended claims.

What is claimed is:

1. A substrate disk comprised of a first and a second substrate (1,2) connected to one another, wherein said first and second substrates have center holes (3,4), wherein said first substrate (1) has at least one projection (5) positioned at a circumference of said center hole (3) of said first substrate (1) and projecting from a face (6) of said first substrate (1), and wherein said center hole (4) of said second substrate (2) has an inner edge facing said first substrate (1) and said inner edge has a recess (8).

2. A substrate disk according to claim 1, wherein said at least one projection (5) is an annular projection surrounding said center hole (3) of said first substrate (1).

3. A substrate disk according to claim 1, wherein a plurality of said projections (5) surround said center hole (3) of said first substrate (1) and are spaced from one another by identical angular spacings.

4. A substrate disk according to claim 1, wherein said at least one projection (5) covers at least a portion of a circumferential wall surface of said center hole (4) of said second substrate (2).

5. A substrate disk according to claim 4, wherein said at least one projection (5) completely covers said circumferential wall surface of said center hole (4) of said second substrate (2).

6. A substrate disk according to claim 1, wherein said center hole (4) of said second substrate (2) has a diameter that is greater than an outer diameter of said at least one projection (5).

7. A substrate disk according to claim 1, wherein said recess (8) is concave.

8. A substrate disk according to claim 1, wherein said at least one projection (5) has a transitional portion (7) connected to said face of said first substrate (6).

9. A substrate disk according to claim 8, wherein said transitional portion (7) is slanted.

10. A substrate disk according to claim 8, wherein said transitional portion (7) is rounded.

* * * * *